(12) United States Patent
Studnicka

(10) Patent No.: US 10,572,783 B2
(45) Date of Patent: Feb. 25, 2020

(54) CONTEXTUAL MACHINE READABLE CODES

(71) Applicant: PayPal, Inc., San Jose, CA (US)

(72) Inventor: Todd Studnicka, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 85 days.

(21) Appl. No.: 15/854,611

(22) Filed: Dec. 26, 2017

(65) Prior Publication Data
US 2019/0197377 A1 Jun. 27, 2019

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 7/1434* (2013.01); *G06K 19/06056* (2013.01); *G06K 19/06075* (2013.01)

(58) Field of Classification Search
CPC .......... G06K 19/06037; H04W 40/244; G06Q 20/41
USPC ...... 235/462.1, 375, 462.08, 462.12, 462.16, 235/462.2; 705/14.38
See application file for complete search history.

(56) References Cited

U.S. PATENT DOCUMENTS

| 6,758,400 B1* | 7/2004 | Reasoner | G06K 7/14 235/462.01 |
| 7,913,922 B1 | 3/2011 | Roth | |
| 9,424,504 B2 | 8/2016 | Annamalai et al. | |
| 2002/0091569 A1* | 7/2002 | Kitaura | G06Q 30/02 705/14.26 |
| 2005/0067489 A1* | 3/2005 | Jones | B41M 3/144 235/380 |
| 2006/0215931 A1 | 9/2006 | Shimomukai | |
| 2009/0132344 A1* | 5/2009 | Otto | G06Q 10/087 705/14.38 |
| 2010/0155464 A1 | 6/2010 | Swayn et al. | |
| 2012/0091202 A1* | 4/2012 | Cohen | G06F 21/33 235/382 |
| 2013/0112760 A1 | 5/2013 | Schory et al. | |
| 2013/0100354 A1 | 8/2013 | Kim | |
| 2013/0221105 A1* | 8/2013 | Cheong | G06K 19/06037 235/469 |

(Continued)

FOREIGN PATENT DOCUMENTS

JP 5187383 4/2013

OTHER PUBLICATIONS

"[Solved] rounding edges of QR code squares?", ImageMagick, 4 pages [online], [retrieved on Dec. 13, 2015]. Retrieved from the Internet: <URL:http://www.imagemagick.org/discourse-server/viewtopic.php?t=18815>.

(Continued)

*Primary Examiner* — Allyson N Trail
(74) *Attorney, Agent, or Firm* — Haynes and Boone LLP

(57) ABSTRACT

Methods and systems for machine-readable codes that provide different information in response to different context and/or that age are disclosed herein. The codes described herein may be configured to provide different information depending on the age of the code, the day that the code was scanned, how the code was handled, and/or other factors. The code may include features that indicate an age of the code and the message determined by scanning the code may be different depending on the age of the code.

20 Claims, 5 Drawing Sheets

(56) References Cited

U.S. PATENT DOCUMENTS

| | | | | |
|---|---|---|---|---|
| 2014/0095888 A1* | 4/2014 | Dougharty | ............... | G09C 5/00 |
| | | | | 713/189 |
| 2014/0121487 A1* | 5/2014 | Faybishenko | .......... | G16H 50/20 |
| | | | | 600/365 |
| 2014/0213318 A1* | 7/2014 | Leem | .................... | G06F 3/0486 |
| | | | | 455/556.1 |
| 2015/0121625 A1* | 5/2015 | Myers | .................... | A47C 21/00 |
| | | | | 5/636 |
| 2015/0161918 A1* | 6/2015 | Byrne | .................. | G09F 3/0291 |
| | | | | 426/87 |
| 2015/0206149 A1* | 7/2015 | Kurian | ............. | G06Q 20/38215 |
| | | | | 705/71 |
| 2015/0213402 A1* | 7/2015 | Stoner | ................ | G06Q 10/0835 |
| | | | | 705/40 |
| 2015/0339838 A1 | 11/2015 | Friedman et al. | | |
| 2016/0125401 A1* | 5/2016 | Li | ......................... | G06Q 10/04 |
| | | | | 235/380 |
| 2016/0321473 A1* | 11/2016 | Decoux | ............. | G06K 19/06037 |
| 2017/0180581 A1* | 6/2017 | Yoshizaki | .......... | G06K 7/10544 |
| 2017/0180593 A1* | 6/2017 | Nemoto | ............. | G06K 7/10366 |
| 2017/0193260 A1* | 7/2017 | Prusik | .................. | G06K 7/1473 |
| 2017/0337458 A1* | 11/2017 | Ophardt | .................... | A47K 5/12 |
| 2017/0353909 A1* | 12/2017 | Kawanishi | ............ | H04W 4/021 |
| 2019/0034897 A1* | 1/2019 | Gao | ........................ | G06Q 20/18 |

OTHER PUBLICATIONS

"QR Code Readers", Feb. 2, 2012, 1 page [online]. Retrieved from the Internet: <URL:https://web.archive.org/web/20120202073812/http://qrcgenerator.com/>.

Schieb, Vincent, "QR Code hacks: modifying and altering for artistic fun", Aug. 3, 2010, 10 pages [online], [retrieved on Feb. 14, 2017]. Retrieved from the Internet: <URL:http://beautifulpixels.blogspot.com/2010/08/qr-code-hacks-modifying-and-altering.html>.

* cited by examiner

CONTEXTUAL MACHINE READABLE CODES

BACKGROUND

Field of the Invention

The present invention generally relates to machine-readable codes, and more particularly to such codes that provide different content based on when the code is scanned.

Related Art

Machine readable codes, such as QR codes, have become ubiquitous due to the wide range of applications that have been found for them, including advertising, commercial tracking, entertainment and transport ticketing, product-loyalty marketing (e.g., QR codes used for coupons that can be redeemed using a mobile app for QR code decoding), in-store product labeling, and other content delivery through scanning/reading by user computing devices. Such codes offer higher content capability, fast readability and greater storage capacity compared to the older UPC bar codes. The codes may contain information that is indecipherable to a human being. Instead, such codes need to be scanned or read by a computing device to derive information from the code. For example, a QR code scanner from a user smart phone may scan a QR code and convert data obtained from the QR code into some form of useful information or content (e.g., a delivery address). As QR codes and other machine-readable codes become more prevalent in everyday life, improvements in the use of such codes may have a beneficial effect on commerce and the economy, as well as increase functionality of user computing devices, such as by delivering improved content to the user through their computing devices.

Figure 1:
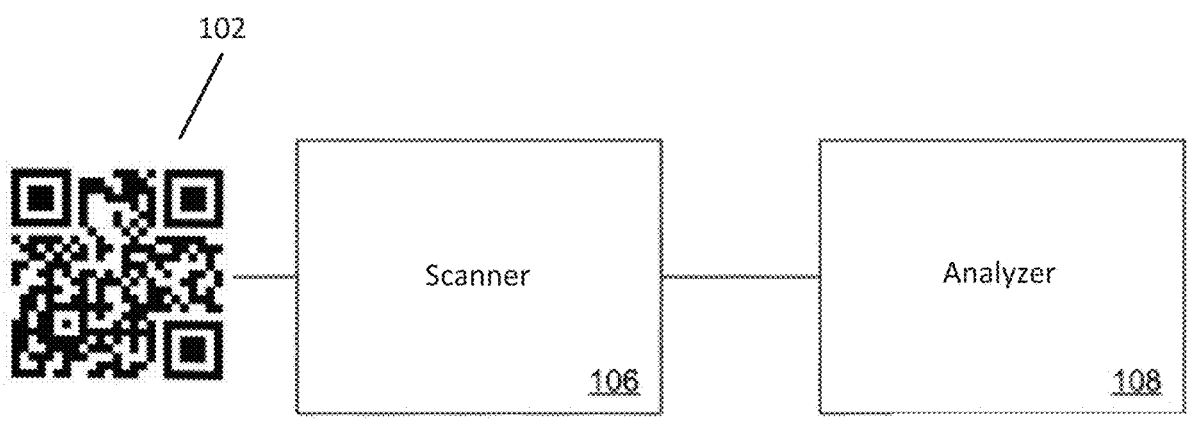
FIG. 1 is a block diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for machine-readable or scannable codes that may provide different content in response to different scanning contexts or code age. Such codes may include QR codes and other types of matrix barcodes as well as linear bar codes. Such codes may include data that may be indecipherable to a human, but may be determined by a machine scanner when the code is read by the scanner. For the purposes of this disclosure, the systems, methods, and techniques described herein for use with QR codes may also be used for other types of machine-readable codes. The codes may be printed on tangible medium, such as paper, displayed on an electronic display, created out of tangible mediums (e.g., cut out of steel), and/or otherwise displayed and scannable by a user computing device equipped with a code scanner A few examples of codes include QR codes storing information such as addresses, URLs, transaction information (pricing information, return policy, any discounts), sorting information, information about an item that the QR code is located on or associated with, and other content associated with the code. QR codes appear in magazines, on signs, on buses, on business cards, and on almost any object from which users may obtain information from. Users with a camera phone equipped with a QR scanner application may scan the image of the QR code to display text or contact information, connect to a wireless network, or open a web page in the phone's browser.

The codes described herein may be configured to, when scanned, provide different information or content depending on the age of the code, the day that the code was scanned, how the code was handled, and/or other factors. In certain embodiments, the code may include features that indicate an age of the code, and the message or content determined by scanning the code may be different depending on the age of the code.

Such codes that provide different information in response to different conditions may allow for codes to be able to communicate additional content or change a message communicated depending on conditions. Codes may be automatically updated and so may not need to be replaced or may need to be replaced less frequently. Furthermore, flexibility of codes may be increased as the same code may communicate different content in response to different conditions. Also, in certain embodiments, as the code may provide different content in response to different conditions, such content may be determined only if up to date decryption algorithms are available. As fraudsters are unlikely to have the most current decryption algorithms, such codes may prevent fraud by, for example, not providing any content if the decryption algorithm is out of date or otherwise unable to decrypt the code.

FIG. 1 is a block diagram showing a system according to an embodiment of the disclosure. A machine-readable code 102 may be printed, rendered on an electronic display, created out of tangible mediums, and/or created in such a way that allows for a scanner 106 to read code 102. Code 102 may be a barcode, a QR code, and/or other types of matrix barcodes. Code 102 may, when scanned, provide content, direct the scanner to access certain websites, files, or other information, provide an address, conduct a transaction or aid in conducting the transaction, and/or allow for an analyzer 108 to access content through one or more other techniques.

Scanner 106 may be any scanner configured to scan code 102 and provide data to analyzer 108. Scanner 106 may be a barcode scanner, a two dimensional visual camera, a thermal camera, a three dimensional camera, or another such device capable of scanning code 102. Scanner 106 may scan code 102 and provide data related to scanning of code 102 to analyzer 108.

Analyzer 108 may receive data from the scanning of code 102 by scanner 106 and determine a message or content from the data. Analyzer 108 may determine the message from reading of one or more portions of code 102. Thus, while analyzer 108 may read all of code 102 to determine the message in certain instances, in other instances, analyzer 108 may read only a portion of code 102 to determine the message. In certain embodiments, whether analyzer 108 reads all or only a portion code 102 may depend on the age of code 102, the time of day, the day of the week, month, year, or other time period, how code 102 was scanned, or another factor fully or partially associated with the scanning of code 102.

For example, code 102 may include a first portion, a second portion, and a third portion. The first portion may indicate an age of code 102, e.g., how long since the code was created or generated. Analyzer 108 may receive an image of code 102 from scanner 106. Analyzer 108 may then read the first portion to determine an age of code 102. If the age of code 102 is lower than a threshold, analyzer 108 may read both the second portion and the third portion of code 102 to determine a first message. If the age of code 102 is higher than the threshold, analyzer 108 may read only the second portion to determine a second message.

Analyzer 108 may be a part of, for example, a shipping control system (e.g., delivery control system), an inventory management system, a point of sale terminal, an automated teller machine, a mobile device (e.g., such as a portable point of sale terminal, an individual's mobile device, etc.), or the like. Analyzer 108 may be any device configured to determine a message or content from a scanned code such as a scanned QR code.

Generally, processes described herein may begin with generation of code 102. Code 102 may then be scanned or otherwise read by scanner 106. Scanner 106 may then send code data to analyzer 108. Analyzer 108 may determine one or more conditions at the time of scanning of code 102, such as the age of code 102 at the time of scanning or the day of the week at the time of scanning. In response to the one or more conditions, analyzer 108 may determine a message from the code data. Thus, content delivered to a user device may be different at different times, even though the code is the same, thereby increasing or improving the amount of information the code can deliver. With conventional codes, multiple different codes would be needed to deliver multiple types of content or information.

Figure 2:
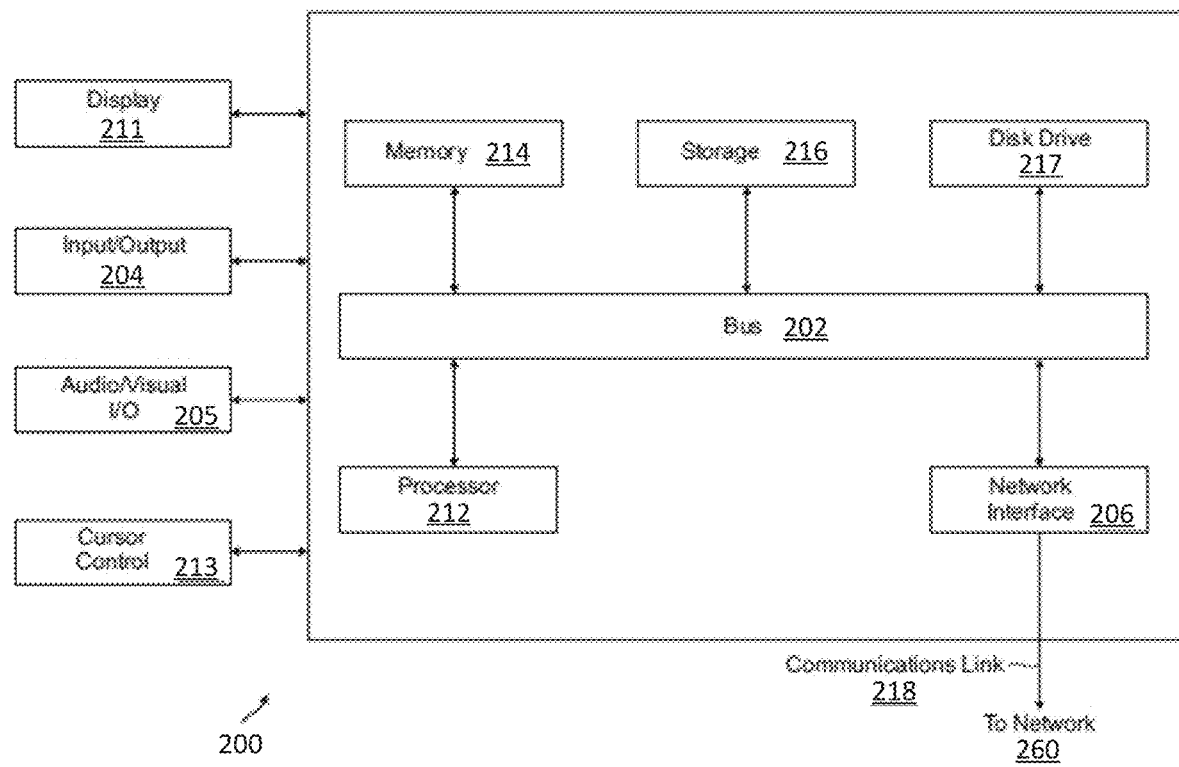
FIG. 2 is a block diagram showing an electronic device according to an embodiment of the disclosure.

FIG. 2 is a block diagram showing an electronic device according to an embodiment of the disclosure. It should be appreciated that electronic devices described herein, such as analyzer 108 or a device for generating a code, whether utilized by users, merchants, payment providers, inventory analyzers, delivery systems, or other parties, may be implemented as a computer system 200 in a manner as follows.

Computer system 200 includes a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio.

A transceiver or network interface 206 transmits and receives signals between computer system 200 and other devices, such as another user device, a merchant server, or a payment provider server via network 260. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices via a communication link 218. Processor 212 may also control transmission of information, such as cookies or IP addresses, to other devices.

Components of computer system 200 may also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PSTN, and/or various other wired or wireless networks, including telecommunications, mobile, and cellular phone networks) may perform instruction sequences to practice the present disclosure in coordination with one another.

Figure 3:
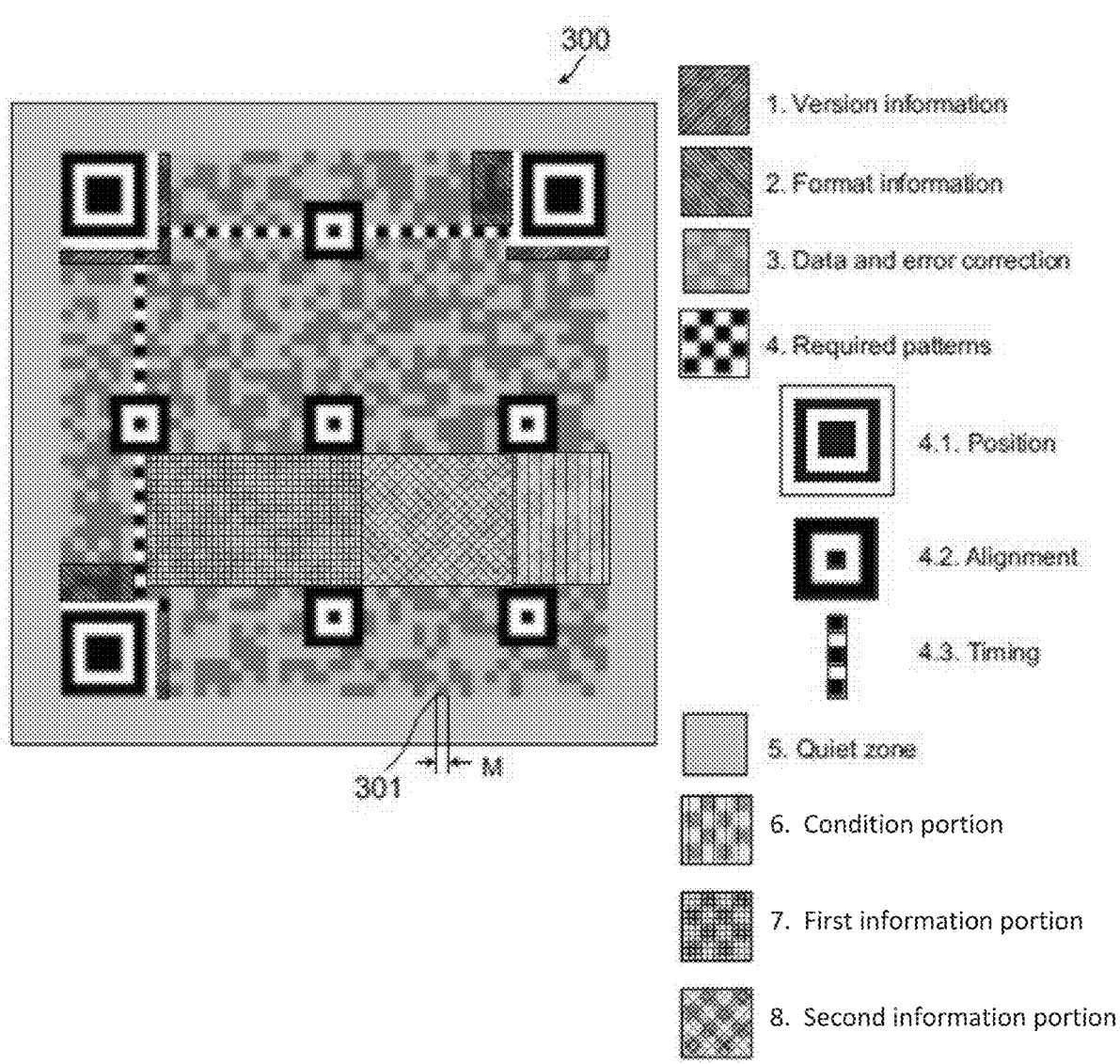
FIG. 3 is a diagram of a QR code showing various regions of the QR code and their functions according to an embodiment of the disclosure.

FIG. 3 is a diagram of a QR code showing various regions of the QR code and their functions according to an embodiment of the disclosure. As seen in FIG. 3, QR code 300 may be composed of dark or light portions or modules—such as module 301—which may resemble square dots arranged in a square grid, which can be read by a scanner and processed, such as using Reed-Solomon error correction, until the image can be appropriately interpreted. Such processing can be performed by the scanner, by an analyzer, or through another device. The number of modules or portions in a QR code may depend on its version, with version 1 QR codes having 21×21 modules and version 40 QR codes having 177×177 modules.

The area of the QR code may be divided into different types of patterns, as shown by the various shadings and cross hatchings seen in FIG. 3 and indicated by the legend accompanying FIG. 3. Thus each module may be allocated to or belong to a particular region. Various types of regions are indicated by the legend of FIG. 3 which accompanies the QR code example of FIG. 3 and the matching cross hatchings and shadings of the QR code example.

Version information (legend item 1 of FIG. 3) refers to the number of modules constituting the QR code and can range from 1 to 40, with version 1 having 21×21 modules and version 40 having 177×177 modules. Format information (legend item 2) may record the error correction level and the mask pattern used for the QR code modules. Reed-Solomon error correction may be implemented, for example, at one of four levels. The higher the error correction level, the less is the data storage capacity for a given version, but the higher the robustness or reliability of reading the data from the QR code. Error correction levels may be designated as L (low, 7% of codewords can be restored), M (medium, 15% of codewords can be restored), Q (quartile, 25% of codewords can be restored), and H (high, 30% of codewords can be restored).

The amount of data that can be stored in the QR code 300 may depend on the data type (mode, or input character set, which can be, for example, one of numeric, alphanumeric, binary, or kanji), version (1, . . . , 40, indicating the overall dimensions of the symbol), and error correction level. For example, the maximum storage capacities occur for version 40, error correction level L.

Data and error correction (legend item 3 of FIG. 3) encodes the data contained in the QR code as codewords using, for example, Reed-Solomon error correction code. As seen in FIG. 3, the data and error correction region may include certain areas or modules of the QR code 300.

Required patterns (legend item 4 of FIG. 3) include position (also referred to as finder) patterns (legend item 4.1 of FIG. 3) shown as the three blocks that may include squares, e.g., several nested squares, in the corners of the QR code at the top left, top right, and bottom left. Required patterns (legend item 4) also may include alignment patterns (legend item 4.2) shown as being similar to finder patterns, but smaller, and placed throughout the QR code. Additional regions of the QR code may include timing patterns (legend item 4.3) shown as a row or column of alternating light and dark modules and a quiet zone (legend item 5).

Condition portion (legend item 6) may be composed of certain areas and modules of the QR code and may indicate an age or date of creation of the QR code. Condition portion may also include information on whether the QR code was created on a weekday or weekend or which day of the week the QR code was created. Alternatively or additionally, the condition portion may include information on a location of creation of the QR code, user information such as information related to where the QR code should be used, which parties should handle the QR code, information related to a time of day, or other such information. The condition portion may be a standard portion of the QR code (e.g., may be composed of standard modules as shown in FIG. 3) and/or may include non-standard indicators or symbols (e.g., may include a visually distinct indicator of the age of the QR code different from the blocks shown in FIG. 3).

The condition portion may be configured to provide different information depending on a scanning condition of the QR code. Thus, if the QR code is scanned at a first angle, the condition portion may provide a first set of information (e.g., may instruct the scanner or analyzer to read the rest of the QR code to determine the message) while if the QR code is scanned at a second angle, condition portion may provide a second set of information (e.g., that the scan is invalid and no additional portion of the QR code should be read by the scanner or analyzer and, instead, an error message should be outputted).

In response to the condition portion, the scanner or analyzer may read a portion or all of the QR code. For example, the QR code may be used for delivery (e.g., may be attached to a package and scanned to indicate a delivery address). After the QR code is scanned, the analyzer, from the condition portion, may determine a date of creation of the QR code and determine that the current date is 6 days from the date of creation and so the age of the QR code is lower than a threshold, which may be 14 days or other number of days higher than 6. The analyzer may then, in response to determining that the QR code age is lower than the threshold, read a first information portion (legend item 7) and a second information portion (legend item 8) and determine a first message, such as the delivery address, from reading the first and second information portions. Alternatively, the analyzer may determine that the QR code age is higher than the threshold and read only the first information portion and determine a second message, such as a message to return the package to a return address, from reading just the first information portion.

In another embodiment, the condition portion may indicate a specific geographical area. The analyzer may receive data directed to the location of the scanner and the condition portion may indicate whether to read certain portions of the QR code in response to the location of the scanner. Thus, the scanner may indicate its location as within California and the condition portion may cause the analyzer to analyze certain portions of the QR code to provide a California delivery address. Alternatively, the scanner may indicate its location as within Nevada and the condition portion may then cause the analyzer to analyzer certain portions of the QR code to provide a Nevada delivery address. As such, depending on the location of the scanner and QR code (and the package that the QR code is coupled to), different delivery addresses may be provided and so geographically appropriate messages may be provided.

In another example, the QR code may be used as a purchase code (e.g., to determine a price of an item that the QR code is coupled to). After the QR code is scanned, the analyzer may determine a day of the week. The analyzer may also read the condition portion. The analyzer may determine that the current day is a Tuesday and the condition portion may indicate to only read the first information portion on a Tuesday. The analyzer may then read the first information portion and determine that the price of the item is $7.99 on a Tuesday. Alternatively, the analyzer may determine that the current day is a Sunday and the condition portion may indicate to read the first and second information portions on a Sunday. The analyzer may then read the first and second information portions and determine that the price of the item is $8.99 on a Sunday.

Different embodiments of the QR code may include a number of different portions and such portions may be located in different areas of the QR code. For example, the condition portion, the first information portion, the second information portion, and other regions of the QR code may be located in different areas of the QR code. Also, certain other embodiments may include information portions additional to the first and second information portion. Alternatively, other embodiments of the QR code may only include one information portion and a message may be determined from the QR code that may vary depending on certain determined conditions based on reading the one information portion and the condition portion.

While certain embodiments may determine a message from the QR code by reading the condition portion and various information portions and may thus provide different messages even though the QR code does not visually change, other embodiments may visually change the QR code. Such visually changing QR codes may not include a condition portion. Furthermore, different regions or portions of the QR code may, for example, be printed with inks that have different aging rates. Accordingly, the first information portion may be printed with a first ink that has a first aging rate and the second information portion may be printed with a second ink that has a second aging rate. The second aging rate may be greater than the first aging rate so that the second information portion may not be scannable while the first portion may still be scannable.

When the QR code is older than a threshold, the scanner may only be able to scan the first information portion and not the second information portion. The analyzer may determine a first message from the scanned image of the QR code when the second information portion is not scannable. Alternatively, if the QR code is younger than the threshold, the scanner may be able to scan both the first and the second information portions. The analyzer may then determine a different second message from the scanned image of the QR code that includes both the first information portion and the second information portion.

Figure 4:
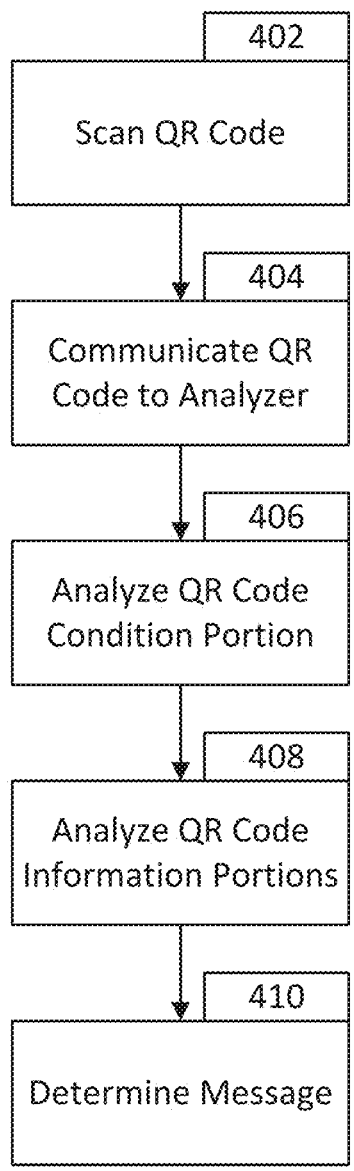
FIG. 4 is a flowchart showing an example technique of determining a message from a QR code according to an embodiment of the disclosure.

FIG. 4 is a flowchart showing an example technique of determining a message from a QR code according to an embodiment of the disclosure. In block 402, a QR code may be scanned by a scanner. The scanner may, for example, obtain an image of the QR code. The image may then be communicated to an analyzer in block 404.

After the analyzer has received the QR code image, the analyzer may search for a condition portion of the QR code. The condition portion may then be analyzed in block 406 to determine how to read one or more other portions of the QR code. The condition portion may indicate, for example, an age of the QR code, whether to read different portions of the QR code in response to a current condition (e.g., a day of the week or a weather condition for pricing of an umbrella), a modifier to be applied to information determined from the QR code (e.g., a $2 discount may be applied to a price read from the QR code if the current date is within a month before Christmas), how the QR code was scanned (e.g., the condition portion may be read in a different manner if scanned from different angles or different distances), and/or may indicate other information to determine how certain remaining portions of the QR code are read.

In block 408, after the condition portion has been analyzed, other portions, such as one or more information portions may be read. Depending on the information contained within the condition portion, the one or more information portions may be read, as described herein. A message may then be determined from the one or more information portions in block 410. Accordingly, depending on the condition portion, different information portions may be read and different messages may be determined in response to reading the different information portions.

Figure 5:
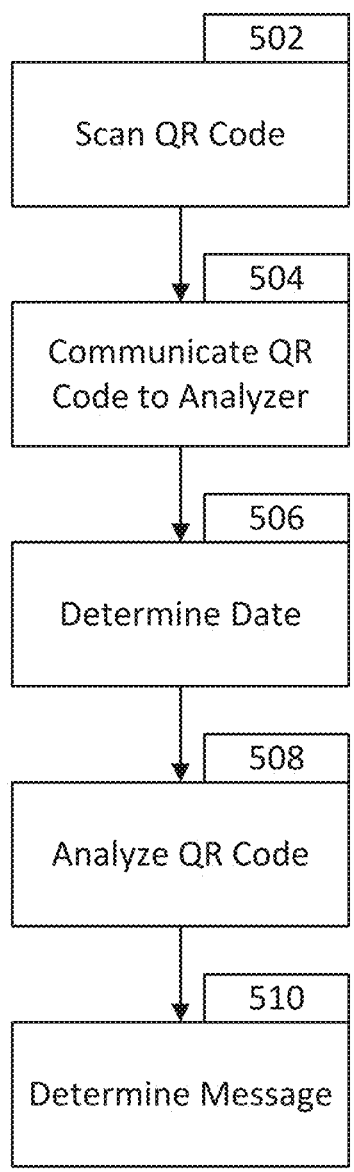
FIG. 5 is a flowchart showing another example technique of determining a message from a QR code according to an embodiment of the disclosure.

FIG. 5 is a flowchart showing another example technique of determining a message from a QR code according to an embodiment of the disclosure. In block 502, a QR code may be scanned by a scanner and the scanner may communicate data associated with the scanned QR code to an analyzer in block 504.

After the analyzer has received the QR code image, in block 506, a date such as a calendar date, a day of the week, a day of the month, a month, a season, or a quarter may be determined. In response to the date determined in block 506, the QR code image may be analyzed in block 508 and a message determined in block 510. The analyzer may analyze various information portions of the QR code image in response to the determined date. Thus, if the QR code is scanned to determine a URL to access and the date is determined to be within a first quarter of a year, the analyzer may read the first and second information portions to determine a URL that relates to a spring catalog. However, if the date is determined to be within a second quarter of a year, the analyzer may read second and third information portions to determine a URL that relates to a summer catalog. Accordingly, different information may be presented in response to different determined dates.

As such, a single machine-readable code can be used to convey content or information that previously would require multiple different codes, thereby improving the usefulness and desirability of machine-readable codes. For example, mediums delivering or displaying codes may benefit both aesthetically and functionally. For the former, the medium is not cluttered with many different codes, and for the latter, extra display space can be used to convey content otherwise reserved for multiple machine-readable codes.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A system comprising:
a non-transitory memory; and
one or more hardware processors coupled to the non-transitory memory and configured to read machine- executable instructions from the non-transitory memory to cause the system to perform operations comprising:
receiving a machine-readable code image, wherein the machine-readable code image comprises a first portion and a second portion;
determining an age from the first portion; and
reading, in response to determining the age, the second portion.

2. The system of claim 1, wherein the machine-readable code image further comprises a third portion and wherein the operations further comprise:
determining that the age is greater than a first threshold; and
in response to determining that the age is greater than the first threshold, disregarding content contained within the third portion.

3. The system of claim 2, wherein operations further comprise:
determining a message from the second portion but not the third portion.

4. The system of claim 1, wherein the machine-readable code image further comprises a third portion and wherein the operations further comprise:
determining that the age is below a first threshold; and
obtaining, in response to the determining that the age is below the first threshold, content from the third portion.

5. The system of claim 4, wherein operations further comprise:
determining a message from the second portion and the third portion.

6. The system of claim 5, wherein the message determined from the second portion and the third portion is different than a message determined from only the second portion.

7. The system of claim 1, wherein the first portion comprises an age indicating symbol.

8. The system of claim 1, wherein reading the second portion comprises determining that a code corresponding to the machine-readable code image has expired.

9. The system of claim 1, wherein reading the second portion comprises determining a return address.

10. The system of claim 1, wherein the machine-readable code image is a QR code image.

11. A method comprising:
receiving data from a machine-readable code, wherein the machine-readable code comprises a first portion and a second portion;
determining a date the data was received;
based on the date, obtaining content from the first portion; and
determining a message from the first portion based on the date.

12. The method of claim 11, wherein determining the date comprises determining a day of a week and wherein determining the message is based on the day of the week.

13. The method of claim 11, wherein message comprises a delivery address and wherein the delivery address is based on the date.

14. The method of claim 12, wherein the message comprises a price and wherein the price is based on the date.

15. The method of claim 11, further comprising:
determining a scan angle of the machine-readable code, wherein determining the message is further based on the scan angle.

16. The method of claim 15, wherein the message is an invalid scan message.

17. The method of claim 11, further comprising:
based on the date, further obtaining content from the second portion, wherein the message is further determined from the second portion.

18. A non-transitory machine-readable medium having stored thereon machine-readable instructions executable to cause a machine to perform operations comprising:
receiving a machine-readable code image, wherein the machine-readable code image comprises a first portion and a second portion;
determining an age from the first portion; and
reading, based on the age, the second portion.

19. The non-transitory machine-readable medium of claim 18, wherein the first portion comprises a first portion ink having a first ink aging rate, and wherein the second portion comprises second portion ink having a second ink aging rate greater than the first ink aging rate.

20. The non-transitory machine-readable medium of claim 18, wherein the machine-readable code image comprises a third portion comprising an age indicating a symbol of the machine-readable code image.

* * * * *